(12) United States Patent
Bradford (10) Patent No.: US 11,167,930 B1
(45) Date of Patent: Nov. 9, 2021

(54) AUGER CONVEYOR FOR REMOVING UNWANTED CONTAMINANTS FROM A GRANULAR MATERIAL

(71) Applicant: Brent Stanley Bradford, Lancer (CA)

(72) Inventor: Brent Stanley Bradford, Lancer (CA)

(*) Notice: Subject to any disclaimer, the term of this patent is extended or adjusted under 35 U.S.C. 154(b) by 0 days.

(21) Appl. No.: 17/196,111

(22) Filed: Mar. 9, 2021

Related U.S. Application Data (60) Provisional application No. 63/014,245, filed on Apr. 23, 2020.

(51) Int. Cl.
*B65G 33/14* (2006.01)
*B07B 1/24* (2006.01)
*B65G 33/26* (2006.01)

(52) U.S. Cl.
CPC ........... *B65G 33/14* (2013.01); *B65G 33/265* (2013.01); *B65G 2201/04* (2013.01)

(58) Field of Classification Search
CPC .......... B65G 33/14; B65G 33/265; B07B 1/24
USPC ........................... 198/657, 658, 660; 209/293
See application file for complete search history.

(56) References Cited

U.S. PATENT DOCUMENTS

| | | | | |
|---|---|---|---|---|
| 1,948,606 A * | 2/1934 | Weinig | ...................... | B07B 1/18 209/288 |
| 3,394,808 A * | 7/1968 | Thompson | ................ | B07B 1/18 209/245 |
| 5,398,814 A * | 3/1995 | Sime | ......................... | B07B 1/20 209/285 |
| 5,553,534 A * | 9/1996 | Soavi | ................. | B23Q 11/0057 100/145 |
| 8,011,861 B2 * | 9/2011 | Sprouse | ..................... | C10J 3/50 406/53 |
| 8,051,988 B2 * | 11/2011 | Farley | .................... | A01F 12/446 209/293 |
| 8,834,013 B2 * | 9/2014 | Bollschweiler | ....... | B29C 48/285 366/156.1 |
| 8,926,846 B2 * | 1/2015 | DeWaard | ........... | B01D 21/2461 210/803 |
| 10,087,907 B2 * | 10/2018 | Fjalling | .................... | E02B 8/085 |
| 10,486,383 B1 * | 11/2019 | Allard | ................. | B30B 15/0076 |
| 10,598,435 B2 * | 3/2020 | Lepez | ........................ | F27B 9/24 |
| 10,844,881 B2 * | 11/2020 | Fange-Larsen | ......... | F15B 11/17 |

* cited by examiner

*Primary Examiner* — Douglas A Hess
(74) *Attorney, Agent, or Firm* — Christopher J. Dynowski; Ryan W. Dupuis; Ade & Company Inc.

(57) ABSTRACT

An auger conveyor for transferring, from a first location, a mixed material including granular material and unwanted particulate contaminants, to a second location, the granular material substantially free of the unwanted particulate contaminants, comprising a housing in which there is rotatably supported a conveying member in the form of an auger or screw. A portion of the housing is perforated to provide a tubular screen, and the conveying member includes projecting agitation tabs along a length thereof which is coincident with the perforated portion of the housing, to propel the mixed material in the housing towards the screen so as to urge the unwanted particulate contaminants out of the housing leaving the granular material therein for conveyance to the outlet.

30 Claims, 6 Drawing Sheets

AUGER CONVEYOR FOR REMOVING UNWANTED CONTAMINANTS FROM A GRANULAR MATERIAL

This application claims the benefit under 35 U.S.C. 119(e) of U.S. Provisional Application Ser. No. 63/014,245 filed Apr. 23, 2020.

FIELD OF THE INVENTION

The present invention relates generally to an auger conveyor for transferring particulate material, and more particularly to an auger conveyor comprising a perforated housing and agitation tabs to separate, from a mixed input material, unwanted contaminants which are not to be discharged at an outlet of the conveyor.

BACKGROUND

In the agricultural industry, auger conveyors are commonplace for transferring particulate material such as grain from a first location such as a storage bin to a second location such as a transport vehicle which is to deliver the stored grain to a grain elevator operated by another entity in a supply chain.

Grain is often contaminated by insects during storage, which remain mixed in with the grain when it is withdrawn from the storage bin and transferred to another containment structure. These insects may lead to the grain being rejected by a downstream entity in the supply chain, which is especially true when it is desired to export the grain to foreign markets.

SUMMARY OF THE INVENTION

According to an aspect of the invention there is provided an auger conveyor for transferring, from a first location, a mixed material including granular material and unwanted particulate contaminants, to a second location, the granular material substantially free of the unwanted particulate contaminants, comprising:

a housing extending longitudinally from a first end to a second end;

an inlet defined by the housing for receiving the mixed material passed into the housing;

an outlet defined by the housing at a longitudinally-spaced downstream location from the inlet for discharging out of the housing the granular material substantially free of the unwanted particulate contaminants;

a conveying member in the housing configured to transfer particulate material therein from the inlet to the outlet, the conveying member comprising:

a shaft oriented longitudinally of the housing and supported therein for rotation about an axis defined by the shaft;

a flight mounted on the shaft and defining an outer edge following a helical path around the shaft from the inlet to the outlet of the housing, the flight defining a surface between the shaft and the outer edge which is arranged for displacing the particulate material from the inlet to the outlet during rotation of the shaft in a downstream conveyance rotational direction;

wherein the housing comprises a tubular perforated portion commencing at an upstream location from the outlet and extending longitudinally from the upstream location towards the outlet, the tubular perforated portion of the housing locating a plurality of openings to provide a tubular screen surrounding the conveying member;

wherein the openings are configured to permit passage of the unwanted particulate contaminants out of the housing and to retain the granular material therein for conveyance to the outlet;

wherein the conveying member includes a plurality of projecting agitation tabs within a circumferential periphery of the conveying member delimited by the outer edge, the agitation tabs being arranged at axial locations registered with the screen and being configured to propel the mixed material towards the screen during rotation of the shaft in the downstream conveyance rotational direction so as to urge the unwanted particulate contaminants out of the housing leaving the granular material therein for conveyance to the outlet.

This provides a relatively simple modification to an auger conveyor which enables the conveyor to perform a separation action in parallel with a conveyance action to separate components of a mixed input material, primarily by grade, while the material is moved or displaced by the conveyor. Thus additional equipment does not have to be operated in series with the modified auger conveyor during transfer of the material from a first location to a second location.

Preferably, the tubular perforated portion extends longitudinally from said upstream location from the outlet to a downstream location which is also spaced from the outlet in a longitudinally upstream direction of the housing. In such an arrangement, an end portion of the housing defining the outlet and downstream of the tubular screen is substantially imperforate with the exception of the outlet which defines an opening in the housing, such that the material to be discharged is released from the housing in a localized manner.

Preferably, the auger conveyor further includes a substantially enclosed outer containment structure registered with the tubular perforated portion of the housing, with respect to the longitudinal direction of the housing, arranged for containing the unwanted particulate contaminants expelled from the housing, wherein the outer containment structure comprises a tubular peripheral wall spaced outwardly from the tubular perforated portion of the housing and spanning a full length thereof in the longitudinal direction.

Preferably, in such an arrangement, the auger conveyor further includes a blower which is in fluidic communication with the outer containment structure and arranged to generate an airflow for emission into the outer containment structure to convey the separated unwanted particulate contaminants to a discharge port defined by the outer containment structure for subsequent release to collect externally of the outer containment structure.

Preferably, the blower is arranged to generate the airflow in an upstream longitudinal direction which is opposite to the downstream longitudinal direction in which the material is transferred by the conveying member within the housing.

In the illustrated arrangement, ducting which fluidically intercommunicates the blower and the outer containment structure is inclined relative to the housing so as to extend in a longitudinal and inward direction from the blower to the outer containment structure to guide the airflow in a transverse direction across the tubular perforated portion of the housing.

Typically, the housing is inclined such that the outlet is disposed at a higher elevation than the inlet, and in such an arrangement it is preferred that the tubular screen is longitudinally spaced from the inlet so as to be disposed at a higher elevation than the inlet, such that the separated unwanted particulate contaminants in the outer containment structure are gravitationally urged towards the discharge port located at a lower end of the outer containment structure.

Preferably, the agitation tabs project from the flight.

In at least one arrangement, each agitation tab defines a planar leading surface facing generally tangentially of the helical outer edge relative to the downstream conveyance rotational direction for engaging the mixed material during rotation of the conveying member in said downstream conveyance rotational direction.

Preferably, when the agitation tabs project from the flight, the planar leading surface of each agitation tab is oriented non-perpendicularly to a surface of the flight from which the leading surface projects.

Preferably, in such an arrangement, the planar leading surface of each agitation tab forms an acute angle with the surface of the flight.

Preferably, the planar leading surface of each agitation tab substantially lies in a radially extending plane of the shaft.

Preferably, the agitation tabs are disposed at inwardly spaced locations from the outer edge of the flight.

Preferably, the agitation tabs are mounted on a downstream-facing surface of the flight.

In at least one arrangement, each agitation tab is angularly spaced from an adjacent one of the agitation tabs, relative to the shaft, by about 120 degrees.

In at least one arrangement, the tubular perforated portion of the housing is carried in intimate spaced relation to the outer edge of the flight such that there is a gap between the outer edge of the flight and an interior surface of the tubular perforated portion.

In at least one such arrangement, the tubular perforated portion is formed by a tubular screen assembly which is supported in said intimate spaced relation to the conveying member by an outwardly flared end of an upstream imperforate tubular portion of the housing which intimately encloses the conveying member.

Preferably, the housing is supported on a frame by linkage which is configured to move the housing relative to the frame between an inclined working position, in which the housing is disposed in inclined orientation with the outlet at a higher elevation than the inlet, and a generally horizontal maintenance position in which the housing is oriented substantially horizontally with the outlet at a substantially common elevation as the inlet.

Preferably, the housing is pivotally supported on the frame to define a generally-horizontal pivot axis oriented crosswise to the longitudinal direction of the housing, about which the housing pivots in movement between the working and maintenance positions, and the linkage comprises:

a lower arm having a lower end pivotally connected to the frame and extending therefrom in a generally longitudinally upstream direction, relative to the housing, to an upper end of the lower arm;

an upper arm having a lower end pivotally connected to the upper end of the lower arm and extending therefrom in a generally longitudinally downstream direction to an upper end of the upper arm which is pivotally coupled to the housing at a longitudinally downstream location from the pivot axis;

a linear actuator configured for extension and retraction between an upper end pivotally connected to the upper arm and a lower end pivotally connected to the lower arm for moving the housing between the working and maintenance positions;

the lower end of the linear actuator being supported below an imaginary line interconnecting the upper and lower ends of the lower arm so that the linear actuator is disposed in an inclined orientation in the maintenance position of the housing.

Preferably, the frame includes a support post arranged to engage the upper arm at a downstream location from the upper end of the linear actuator when the housing is in the maintenance position.

Preferably, in the maintenance position of the housing, the linear actuator is disposed in a substantially fully retracted condition.

Preferably, in the maintenance position of the housing, the support post is arranged to pass through an opening in the lower arm.

Preferably, the support post is in fixed position relative to the frame.

Preferably, an auxiliary support member mounted on the frame and arranged to selectively engage, in the working position of the housing, the upper arm of the linkage at a downstream location thereon from the upper end of the linear actuator to transmit weight of the housing to the frame in a manner substantially bypassing the linear actuator.

Preferably, when the upper arm is engaged by the auxiliary support member, the outlet of the housing is arranged at an intermediate height above the frame between a maximum height of the outlet in the working position and a minimum height of the outlet in the maintenance position.

Preferably, the frame comprises an axle and a plurality of wheels supported thereon for rotation about an axis defined by the axle, and, when the upper arm is engaged by the auxiliary support member, top and bottom ends of the support member are substantially vertically in-line with the axle.

Preferably, the auxiliary support member is arranged to engage the upper end of the upper arm so as to substantially entirely bypass the linkage to support the weight of the housing disposed in the working position.

Preferably, the auxiliary support member is movable relative to the frame and to the upper and lower arms of the linkage between a raised position in which the support member is standing upwardly from the frame to present a top end thereof for engaging the upper arm and a lowered position in which the auxiliary support member is laying across the frame so as not to obstruct movement of the housing to the maintenance position.

Preferably, the support member is configured to pass through an opening defined in the lower arm in movement to and from the lowered position, such that in the lowered position the auxiliary support member is disposed under the lower arm.

Preferably, a bottom end of the auxiliary support member, which is opposite to the top end, is pivotally connected to the frame such that the auxiliary support member is pivotally movable between the raised and lowered positions.

According to another aspect of the invention there is provided an auger conveyor for transferring a particulate material from a first location to a second location comprising:

a housing extending longitudinally from a first end to a second end;

an inlet defined by the housing for receiving the particulate material passed into the housing;

an outlet defined by the housing at a longitudinally-spaced downstream location from the inlet for discharging the particulate material out of the housing;

a conveying member in the housing configured to transfer particulate material therein from the inlet to the outlet;

a frame coupled under the housing; and a linkage operatively interconnected between the housing and the frame;

wherein the linkage is configured to move the housing relative to the frame between an inclined working position, in which the housing is disposed in inclined orientation with the outlet at a higher elevation than the inlet, and a generally horizontal maintenance position in which the housing is oriented substantially horizontally with the outlet at a substantially common elevation as the inlet.

BRIEF DESCRIPTION OF THE DRAWINGS

The invention will now be described in conjunction with the accompanying drawings in which.

In the drawings like characters of reference indicate corresponding parts in the different figures.

DETAILED DESCRIPTION

The accompanying figures show an auger or screw conveyor generally indicated at 10 for transferring, from a first location such as a first containment structure in the form of a grain bin, a mixed material which is generally particulate in nature and which comprises wanted or coveted granular material such as grain and unwanted particulate contaminants, such as insects which with respect to the grain are also generally particulate in nature, to a second location such as a second containment structure in the form of a tray of a transport vehicle, while discharging at the second location only the coveted granular material, which is substantially free of the unwanted particulate contaminants.

The auger conveyor 10 comprises a generally circular cylindrical housing 12 extending longitudinally along a linear path from a first end 14 to a second end 15. The housing 12 defines an inlet 17 generally at one end such as 14, for receiving the mixed material which is passed into the housing, and an outlet 19 generally at an opposite end of the housing, in this case 15, such that the outlet 19 is disposed at a longitudinally-spaced downstream location from the inlet 17. The outlet 19 permits passage of contents, which are within the housing, out of same. It will be appreciated that in FIG. 1 the housing is shown as truncated, as represented by the parallel jagged lines, for convenience of illustration. In the illustrated arrangement, the inlet 17 is arranged facing generally upwardly so as to be suited for receiving input material by gravity discharge thereof into the housing. Also, in the illustrated arrangement, the outlet 19 is arranged facing generally downwardly so that the conveyed material can be released by gravity from the housing and to the second location. Thus the housing 12 substantially defines a path of conveyance for the material from the inlet 17 to the outlet 19.

Figure 1:
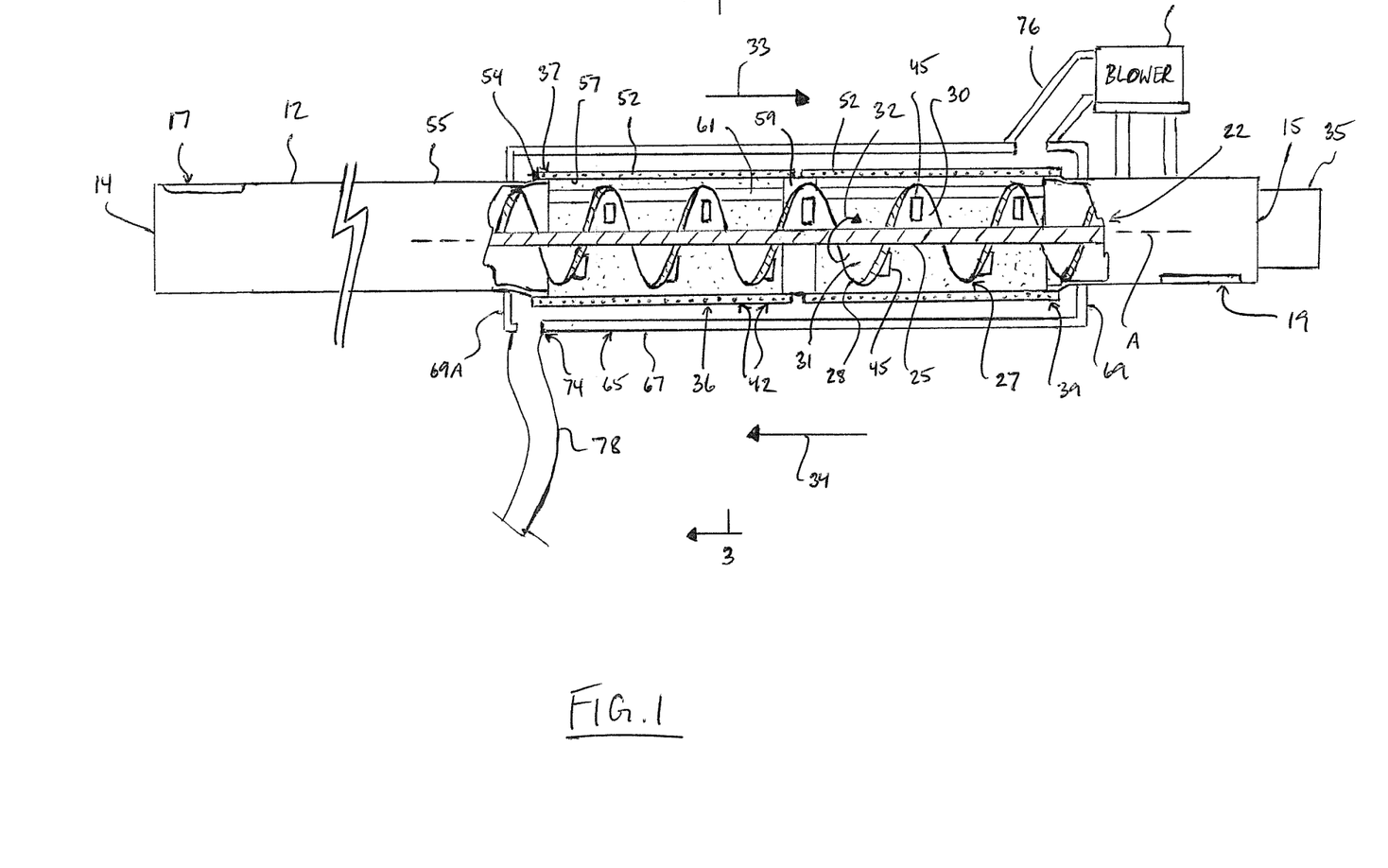
FIG. 1 is a schematic side view of an auger conveyor according to the present invention, where a portion of the auger conveyor is shown in cross-section and some components are omitted for clarity or convenience of illustration.

Furthermore, the auger conveyor 10 includes a conveying member 22 which is disposed in the housing 12 and configured to transfer particulate material therein from the inlet 17 to the outlet 19. The conveying member 22 is substantially in the form of a screw so as to comprise a shaft 25 oriented longitudinally of the housing 12 and supported therein for rotation about an axis A defined by the shaft. The shaft is supported in coaxial relation to an axis of the linearly extending housing 12. The conveying member 22 also includes a flight 27 mounted on the shaft 25 and defining an outer edge 28 following a helical path around the shaft from the inlet 17 to the outlet 19 of the housing. The flight 27 defines a surface 30 between the shaft 25 and the outer edge 28 which is arranged for displacing the particulate material from the inlet to the outlet during rotation of the shaft in a downstream conveyance rotational direction 32. In this rotational direction 32, it is a downstream-facing surface 30 which acts to push the material inside the housing 12 in a downstream longitudinal direction shown by arrow 33. It will be appreciated that the flight 27 also includes an opposite surface 31 which faces upstream in a direction shown by arrow 34, towards the inlet 17, but this surface 31 is not effectively involved in conveyance of the material towards the outlet. In the illustrated arrangement, the flight surfaces 30, 31 span a full radius from the shaft 25 to the outer edge 28 of the flight.

A motor 35 is supported on the housing such as at the end 15 and operatively coupled to the conveying member 22 to drive rotation of same about the shaft axis A.

Returning to the housing 12, the housing 12 is substantially conventional with the exception of a tubular perforated portion indicated at 36 which commences at an upstream location 37 from the outlet 19, which also is spaced from the inlet 17. The tubular perforated portion 36 extends longitudinally from the upstream location 37 towards the outlet 19, and in the illustrated arrangement terminates at a downstream location 39 (relative to the location 37) which is also spaced from the outlet 19 in the longitudinally upstream direction 34. The tubular perforated portion 36 locates a plurality of openings 42 (schematically shown by dots) which are distributed over a length of the tubular perforation portion 36 and over a circumference thereof to provide a tubular screen surrounding a portion of a length of the conveying member 22. That is, the openings 42 are formed through a full thickness of the housing at the perforated portion 36 such that an interior of the housing is communicated with an external environment thereof, over the length of that portion 36.

The openings 42 are configured, primarily by size but also by shape, to permit passage of the unwanted particulate contaminants, which are sized substantially no larger than the openings 42, out of the housing 12 and to retain therein the granular material sized larger than the openings 42 for conveyance to the outlet 19. Depending on the contaminants to be removed, the openings may be differently sized from one arrangement of the invention to the next. Thus the openings 42 provide selective communication of solid particles between the housing 12 and an external environment thereof. Thus the tubular perforated portion 36 acts substantially like a conventional screen to separate mixed particles from one another by grade, permitting passage of smaller particles while preventing passage of larger particles; however, in this case, and contrary to conventional screeners, the screen 36 is stationary so as not to move relative to the remainder of the housing 12.

To encourage the unwanted particulate contaminants to move outwardly towards the screen so as to be subject to screening action, the conveying member 22 includes a plurality of projecting agitation tabs 45 which are supported thereon within a circumferential periphery of the conveying member as delimited by the outer edge 28. The agitation tabs 45 are arranged in axially and angular spaced relation to each other on the conveying member 22 but only at locations thereon which are registered with the screen 36 relative to the shaft axis A, that is they are coincident relative to the axis A of the shaft with the tubular screen 36, where separation by mechanical screening can take place along the housing 12. The agitation tabs 45 are configured to propel the mixed material towards the screen 36, that is in a direction generally transverse to the shaft axis A, during rotation of the shaft 25 in the downstream conveyance rotational direction 32 so as to urge the unwanted particulate contaminants towards the screen so that they can exit the housing 12, leaving the granular material therein for conveyance to the outlet 19.

Figure 2:
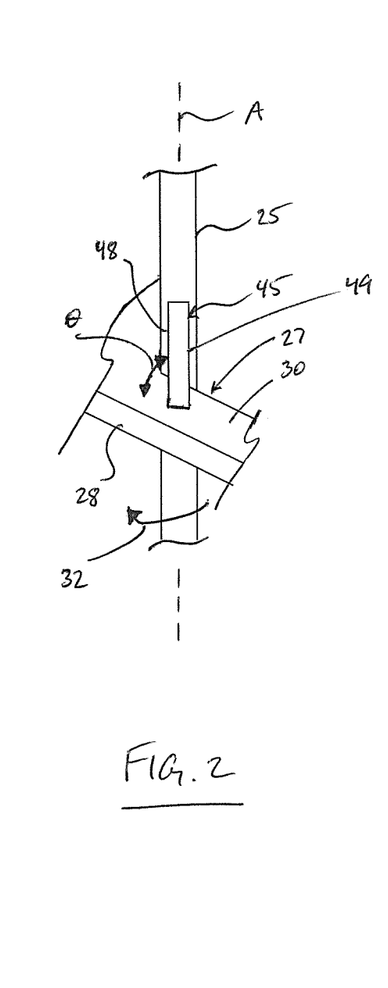
FIG. 2 is a schematic plan view of a portion of a conveying member of the auger conveyor of FIG. 1.

As more clearly shown in FIG. 1, the agitation tabs 45 are mounted on the downstream-facing surface 30 of the flight such that the tabs 45 project from the flight 27 in the longitudinal downstream direction 33. Referring now to FIG. 2, in order to urge the material in a transverse direction of the shaft, so as to move outwardly towards the screen 36, each tab 45 defines a leading surface 48 facing generally tangentially of the helical outer edge relative to the downstream conveyance rotational direction 32 for engaging the mixed material during rotation of the conveying member 22 in this rotational direction, primarily by pushing action. A trailing surface 49 of the respective tab faces generally in an opposite direction to the leading surface 48 and forms an obtuse angle with the surface 30.

The agitation tabs 45 are in the form of plates and thus provide planar leadings surfaces 48. Thus the particulate material lying along a circumferential path of the agitation tabs is displaced in a direction normal to the surface 48 of the respective tab so as to be centrifugally accelerated towards the screen.

Figure 3:
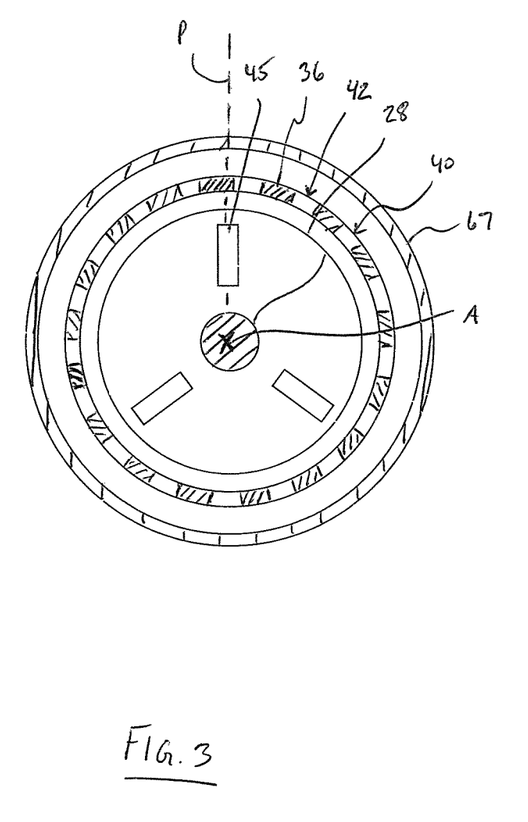
FIG. 3 is a cross-sectional view along line 3-3 in FIG. 1 where some components are omitted for clarity or convenience of illustration.

As shown in FIG. 2, the planar leading surface 48 of each agitation tab is oriented non-perpendicularly to the surface 30 of the flight from which it projects and, more specifically, forms an acute angle θ therewith so as to more effectively urge the material tangentially outwardly towards the screen 36. Furthermore, each tab 45 which is substantially planar lies in a radially extending plane P of the shaft 28 containing the axis A and so does the planar leading surface 48 of the tab, as more clearly shown in FIG. 3.

In the illustrated arrangement, the agitation tabs 45 are disposed at inwardly spaced locations from the outer edge 28 of the flight in addition to being shaped so as not to extend beyond the circumferential periphery of the conveying member 22, so as not to contact the tubular screen 36 and consequently abrade same, the reason for which will be better appreciated shortly. Furthermore, each agitation tab 45 is angularly spaced from an adjacent one of the agitation tabs relative to the helical path of the flight by about 120 degrees around the shaft 25 so as to provide substantially consistent mixing action.

Referring back to FIG. 1, the tubular perforated portion 36 of the housing is formed by a circular cylindrical tubular screen assembly comprising a plurality of arcuate elongated screen members or grates 52 distinct from a remainder of the housing 12 which is substantially imperforate between the inlet and outlet 17, 19, and which is substantially a structural component of the conveyor 10 which supports the conveying member 22 therein.

The screen assembly is supported by a downstream end 54 of an upstream imperforate tubular portion 55 of the housing which intimately encloses the conveying member 22 such that an inner diameter of the housing is substantially equal to an outer diameter of the conveying member 22 as defined by the outer edge 28 of the flight. Thus there is substantially no gap between the flight's outer edge 28 and an inner surface of the housing 12. In the illustrated arrangement, the upstream imperforate portion 55 defines the inlet end 14 of the housing.

As the trough-shaped grates 52 are of substantially lower gauge metallic material than a tubular wall of the housing 12 defining the imperforate portion 55, so as to be more susceptible to damage, the tubular screen assembly is supported in spaced yet still intimate relation to the conveying member 22 by outward flaring of the end 54 to reduce likelihood of contact between the outer edge 28 of the flight and the grates 52. Thus there is provided a small gap between the outer edge 28 of the flight and an interior surface 57 of the tubular perforated portion 36.

The tubular screen assembly collectively formed by the grates 52 is further supported by at least one annular support member 59 encircling the conveying member 22, which is longitudinally spaced from the imperforate portion 55 in the direction 33. The annular support member 59 is connected to the imperforate portion 55 by a plurality of longitudinally-extending support members 61 located at circumferentially spaced positions from one another around the conveying member 22. The longitudinal support members 61 are also in outwardly spaced relation to the outer edge 28 of the flight 27.

Thus the arcuate grates 52 are supported outwardly of the annular support member 59 as well as the longitudinal support members 61 which collectively form a frame assembly of the tubular perforated portion 36 which is connected to the housing 12 to provide structural support for the screen assembly.

The screen assembly is formed by separable upper and lower screen members which are removably interconnectable around the longitudinal and annular support members 61, 59 to collectively encircle the conveying member 22. This enables the screen members to be easily replaceable when damaged or to provide screening for differently sized unwanted contaminants.

Referring back to FIG. 1, the auger conveyor 10 further includes a substantially enclosed outer containment structure 65 registered with the tubular perforated portion 36 of the housing, with respect to the longitudinal direction of the housing, which is arranged for containing the unwanted particulate contaminants expelled from the housing 12. The outer containment structure 65 comprises a generally circular cylindrical tubular peripheral wall 67 extending coaxially of the housing 12 and spaced outwardly from the tubular perforated portion 36. The peripheral wall 69 spans at least a full length of the tubular perforated portion 36, relative to the longitudinal direction of the housing 12, so that contaminants exiting the housing 12 at any location on the tubular perforate portion 36 are contained within the containment structure 65. The tubular peripheral wall 67 is closed at either end thereof by an annular end wall 69 which is longitudinally spaced from a proximal end of the tubular screen, that is, either 37 or 39.

Furthermore, the conveyor 10 includes a blower 72 supported externally of the housing 12 in fluidic communication with the outer containment structure 65, which is arranged to generate an airflow for emission into the outer containment structure 65 to convey the separated unwanted particulate contaminants to a discharge port 74 defined by the outer containment structure for subsequent release so as to collect externally of the outer containment structure. More specifically, the blower 72 is arranged to generate the airflow in the upstream longitudinal direction 34 which is opposite to the downstream longitudinal direction 33 in which the material is transferred by the conveying member 22 within the housing 12, so as to reduce likelihood of the contaminants being reintroduced and being subsequently discharged with the granular material at the outlet 19. As such, not only are the expelled contaminants cleared from or conveyed away from the tubular perforated portion 36 so as not to be reintroduced into the housing 12, the outer containment structure 65 is continuously cleaned by the blower airflow so that the conveyor 10 can operate substantially uninterruptedly without backflow of removed contaminants into the housing 12 for example in the event the outer containment structure 65 were to be full with the contaminants.

Moreover, as will be better appreciated shortly, since the auger conveyor 10 is typically operated for transferring material when the housing 12 is disposed in an inclined orientation in which the outlet 19 is disposed at a higher elevation than the inlet 17, therefore the tubular screen 36, and accordingly the outer containment structure 65 which is registered with same, are longitudinally spaced from the inlet 17 so as to be disposed at a higher elevation than the inlet. Thus the tubular wall 67 of the outer containment structure 65 is arranged in inclined orientation so as to act as a chute for gravitationally urging the separated unwanted particulate contaminants in the containment structure 65 towards a lower upstream end 69A of the outer containment structure where the discharge port 74 is located. Therefore, in the illustrated arrangement, gravity and forced air cooperate to convey the separated contaminants to the discharge port 74.

Ducting, which fluidically intercommunicates the blower 72 and the outer containment structure 65, which is indicated at 76, is inclined relative to the housing 12 so as to extend in a longitudinal and inward direction from the blower 72 to the outer containment structure 65 to guide the airflow in a transverse direction across the tubular perforated portion 36 of the housing. That is, the interconnecting duct 76 extends in the longitudinally upstream direction 34 and generally transversely thereof. Furthermore, the discharge port 74 is located at a longitudinally spaced, upstream and diametrically opposite location to the ducting 76 so as to generally lie along the direction of the airflow as admitted into the outer containment structure 65.

In the illustrated arrangement, the discharge port 74 is communicated with a hose 78 which extends downwardly away from the outer containment structure 65 to gravitationally guide the contaminants to a collection location which is not shown.

In the agricultural industry, auger conveyors are typically used in inclined orientations in which their outlets are disposed at higher elevations than their inlets, which is particularly suited for conveying particulate material from a first containment structure with a hopper bottom discharge to another containment structure. However, this working orientation is not particularly suited for maintaining or replacing the tubular screen assembly.

Figure 4:
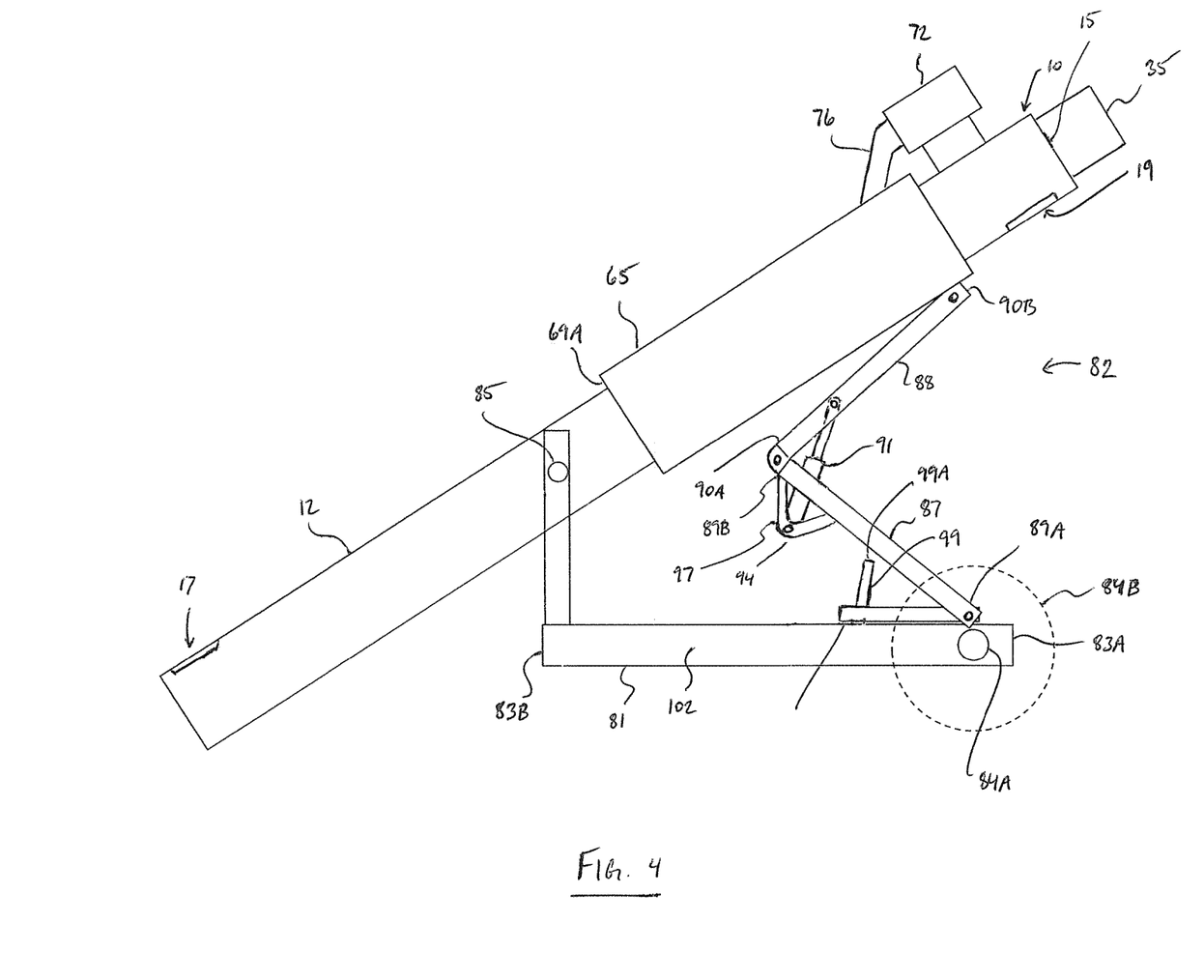
FIG. 4 is a schematic side view of the auger conveyor of FIG. 1 in which a housing thereof is arranged in a working position and where some components are omitted for clarity or convenience of illustration.
Figure 5:
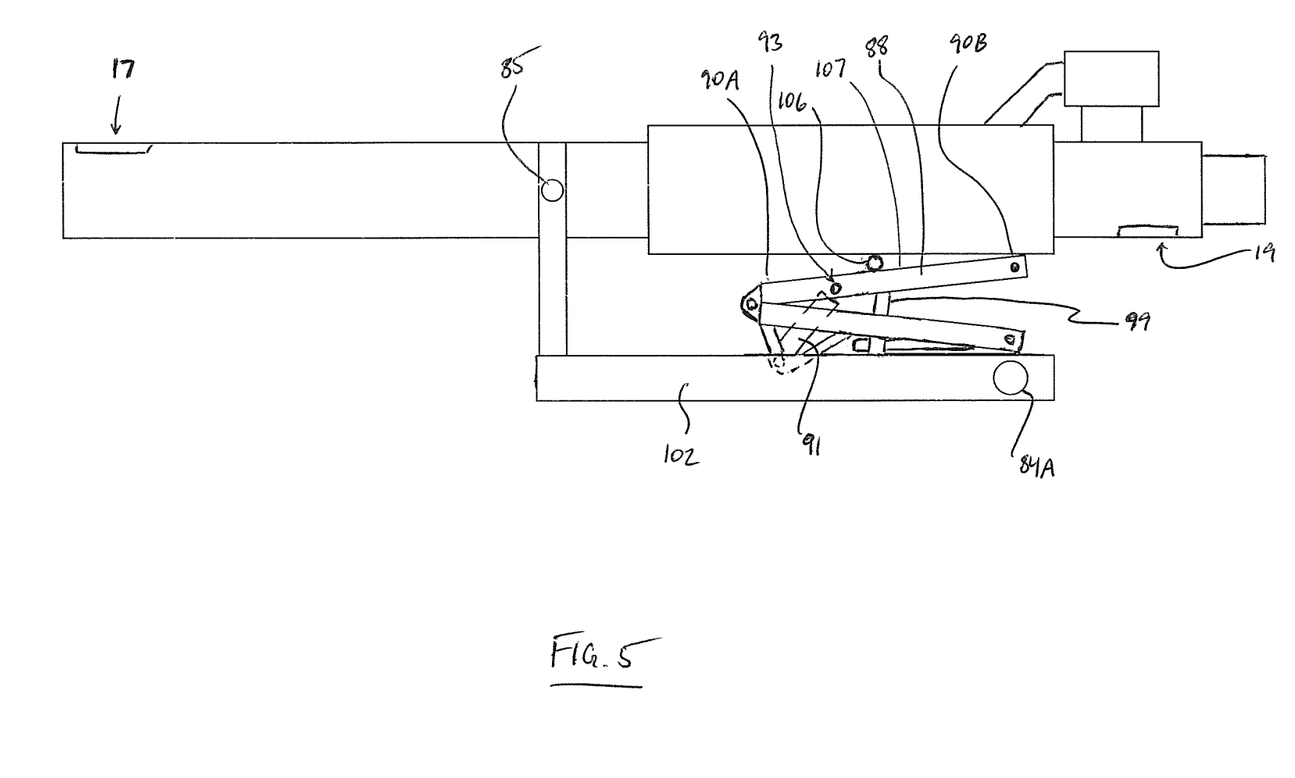
FIG. 5 is a schematic side view of the auger conveyor as shown in FIG. 4 in which the housing is arranged in a maintenance position.
Figure 6:
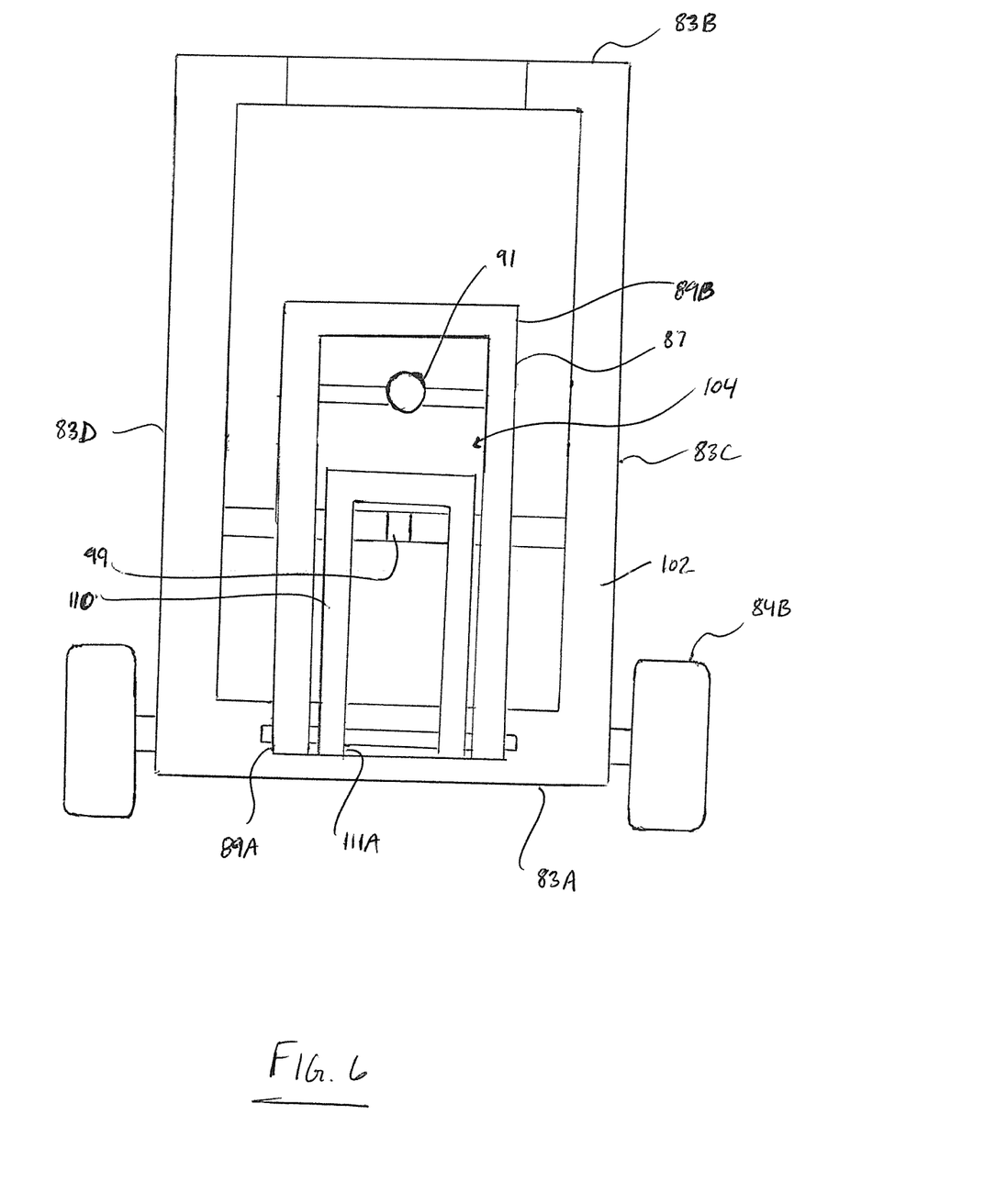
FIG. 6 is a schematic top plan view of a bottom portion of the auger conveyor as shown in FIG. 4.

Accordingly, the illustrated arrangement of auger conveyor 10 is mounted to a frame 81 which is arranged for movement across a support surface such as the ground, and which, generally speaking, carries the housing 12 in spaced relation above a support surface such as the ground. The conveyor 10 is supported on the frame 81 by interconnecting linkage 82 which is configured to move the housing 12 relative to the frame 81 between an inclined working position as shown in FIG. 4, in which the housing 12 is disposed in the inclined orientation with the outlet 19 at a higher elevation than the inlet 17, and a generally horizontal maintenance position as shown in FIG. 5 in which the housing 12 is oriented substantially horizontally with the outlet at a substantially common elevation as the inlet. If the inlet 17 and outlet 19 face in opposite directions, as in the illustrated arrangement, then an opening of the outlet may be disposed at a slightly lower elevation than an opening of the inlet although respective interior portions of the housing 12 which are in communication therewith are arranged at a substantially common elevation. The frame 81 extends longitudinally between front and rear ends 83A, 83B and laterally, in a crosswise direction to the longitudinal direction of the frame, between opposite sides 83C and 83D. The linkage 82 is carried generally laterally centrally of the frame, beneath the housing 12 arranged thereover. Furthermore, there is provided at least one axle 84A supporting a plurality of wheels 84B thereon for rotation about an axis defined by the axle. Preferably, at least one of the axles is supported generally at the front end 83A of the frame, and in such an arrangement there is a second axle with wheels thereon (not shown) may be carried generally at the rear end of the frame. In this arrangement, at least one pair of wheels is preferably steerable. It will be appreciated that in FIG. 4 the wheels 84B are shown in broken line so as not to obstruct visibility of the linkage which would otherwise be hidden.

The conveyor housing 12 is pivotally supported on the frame 81 at 85, at a generally longitudinally central location along the housing, to define a generally-horizontal pivot axis oriented crosswise to the longitudinal direction of the housing, about which the housing 12 pivots in movement between the working and maintenance positions. The horizontal pivot axis at 85 is typically maintained at a generally fixed location relative to the frame 81, above same; however, a height of the axis 85 above the frame 81 may be adjustable so as to maintain the inlet 17 at a substantially common location.

To effect the movement between working and maintenance positions, the linkage comprises a pair of pivotally interconnected arms 87, 89 arranged in a scissor-type configuration and actuated in movement by a linear actuator 91. More specifically, the linkage comprises a lower arm 87 which has a lower end 88A pivotally connected to the frame 81, and which extends therefrom generally in the longitudinally upstream direction 34 to an upper end 88B of the lower arm. There is also provided an upper arm 88 which has a lower end 90A pivotally connected to the upper end 88B of the lower arm 87 and which extends therefrom generally in the longitudinally downstream direction 33 to an upper end 90B of the upper arm which is pivotally coupled to the housing 12 at a longitudinally downstream location from the pivot axis 85, so as to be intermediate the axis 85 and the outlet 19 but closer to the latter than to the former. Thus each linkage arm 87, 88 extends in a generally common direction away from their interconnecting pivot axis substantially collectively defined by upstream ends 88B and 90A to downstream ends 88A and 90B of the arms. Furthermore, the upper arm 88 is inclined upwardly and in the longitudinally downstream direction 33 like the housing 12 in the working orientation.

The linear actuator 91 in the form of a hydraulic cylinder and driven by a hydraulic pump operatively coupled to same and carried on the frame 81 (not shown) is configured for extension and retraction between an upper piston-rod end 93 pivotally connected to the upper arm 88 and a lower base end 94 pivotally connected to the lower arm 87 for moving the housing 12 between the working and maintenance positions by spreading distal ends 89A, 90B of the linkage apart from one another or bringing them together in scissor-like action. Each of the upper and lower actuator ends 93, 94 is connected at an intermediate location between the opposite ends of the corresponding one of the linkage arms 87, 88 closer to the linkage pivot axis defined proximal to end 89B, 90A than to ends of the arms which are distal thereto, that is, 89A and 90B.

In order to enable the housing 12 to approach a substantially horizontal orientation and to return to the working orientation, the lower end 94 of the linear actuator 91 is supported below an imaginary line interconnecting the upper and lower ends 89A, 89B of the lower arm 87 so that the linear actuator is disposed in an inclined orientation in the maintenance position of the housing. This is provided by an additional framework of members 97 fixedly coupled to the lower arm 87 which extends linearly between its opposite ends 89A, 89B, in order to support the lower actuator end 94 below the upper end 89B of the lower arm 87. As such, in the illustrated arrangement the lower arm 87 defines the aforementioned imaginary line interconnecting the upper and lower ends thereof.

The actuator 91 is arranged so that in the maintenance position of the housing 12, as shown in FIG. 5, the linear actuator 91 is disposed in a substantially fully retracted condition, and thus the frame 81 includes a fixed upwardly projecting support post 99 which is arranged to engage the upper linkage arm 88 at a downstream location from the upper end 93 of the linear actuator when the housing is in the maintenance position, and the linkage is in a corresponding substantially collapsed or folded condition, so that the frame 81 carries the weight of the housing 12. The support post 99 is located generally laterally centrally on a body 102 of the frame so as to be coincident with the linkage, and extends from a lower end of the post attached to the body 102 of the frame and through an opening 104 in the lower arm 87 to a free upper end 99A spaced above the frame body 102. It will be appreciated that the frame body 102 operatively supports the axle 84A. The free upper end 99A of the support post is configured to engage the upper arm 88 closer to a connection location of the upper actuator end 93 thereto than to the upper arm end 90B, and preferably substantially immediately downstream thereof along the arm 88 though this is not shown in the figures. A support cross-member 106 is provided on an upper side 107 of the upper arm 88 to bridge a gap between the outer containment structure 65, which is fixedly supported on the housing 12, and the upper arm 88 in the substantially fully collapsed condition. The support cross-member 106 is substantially vertically in-line with the support post 99 in the maintenance position of the housing 12.

To further help brace the linkage 82 in positions of greater stress thereon, which is primarily due to mounting of the lower actuator end 94 below the line joining the lower and upper ends 89A-B of the lower arm 87, there is provided an auxiliary support member 110 mounted on the frame 81 and arranged to selectively engage, in the working position of the housing 12 in which the housing is inclined, the upper arm 88 of the linkage at a downstream location thereon from the upper end 93 of the linear actuator 91 to transmit weight of the housing 12 to the frame 81 in a manner substantially bypassing the linear actuator 91. In the illustrated arrangement, the auxiliary support member 110 is arranged to engage the upper linkage arm 88 when the outlet 19 is arranged at an intermediate height above the frame 81 between a maximum height of the outlet in the working position and a minimum height of the outlet in the maintenance position, which is suited for transport of the auger conveyor 10 which is portable on the frame 81 for relocation.

Figure 7:
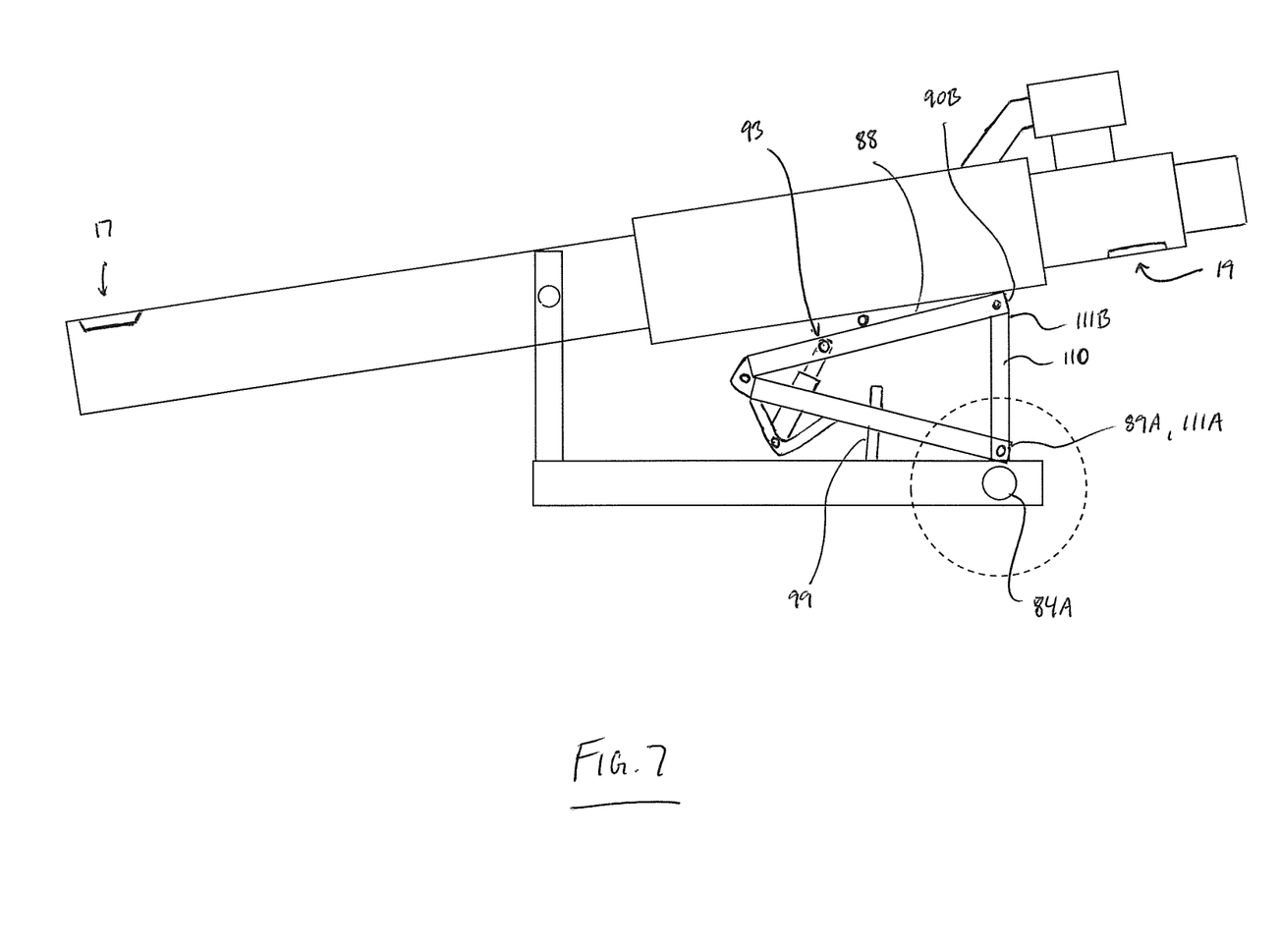
FIG. 7 is a schematic side view of the auger conveyor as shown in FIG. 4 in which the housing is arranged in a transport position.

More specifically, the auxiliary support member 110 is a linearly extending member having a bottom end 111A, which is pivotally coupled to the frame body 102 vertically above the front axle 84A, and a free top end 111B opposite thereto. In the illustrated arrangement, the auxiliary support member 110 shares a common pivot axis with the lower end 89B of the lower arm, such that the auxiliary support member 110 pivots about its bottom end 111A through the central opening 104 defined by the lower arm to move, relative to the frame 81 and to the upper and lower arms 87, 88 of the linkage, from a lowered position in which the auxiliary support member is laying across the frame 81 under the lower arm 87 so as not to obstruct movement of the housing to the maintenance position and a substantially vertically-erect raised position in which the support member 110 is standing upwardly from the frame to present the top end 111B thereof for engaging the upper arm 88, as shown in FIG. 7. In the raised position, the auxiliary support member 110 is arranged to engage the upper end 90B of the upper arm 88 so as to substantially entirely bypass the linkage 82 to support the weight of the housing disposed in the working position, and as the top and bottom ends 111B, 111A are vertically in-line with each other and with the axle 84A then the weight of the housing is transmitted by the member 110 to the axle. In the transport position, the support post 99 is not in engagement with the upper arm 88 which is located at a spaced height above the top end 99A.

It will be appreciated that pivotal coupling of the auxiliary support member 110 provides the most convenient movement between raised and lowered positions of the member 110 while remaining attached thereto, but in other arrangements the auxiliary support member may be removably attached to the frame.

In use, the auger conveyor 10 is arranged between a first containment structure and a second containment structure between which granular material is to be transferred. More specifically, the inlet 17 is disposed in communication with the first containment structure and the outlet 19 is disposed in communication with the second containment structure. Typically, the housing 12 is arranged in the working position so as to be inclined to discharge the transferred material at a greater height than the height at which the material is input to the conveyor 10.

The auger conveyor 10 is then operated to drive rotation of the conveying member 22 in the downstream conveyance rotational direction 32 such that material discharged from the first containment structure and received therefrom by the conveyor 10 is displaced in the downstream longitudinal direction 33 along the housing 12.

As the conveyed material reaches the tubular perforated portion 36 of the housing 12, the agitation tabs 45 act to mix the conveyed material, which contains both wanted granular material and unwanted particulate contaminants, and generally to propel the mixed material against the tubular screen to conduce movement of the unwanted contaminants outwardly towards the screen 36, so that the contaminants pass through the openings 42 defined by the screen while the wanted granular material which is larger is retained in the housing 12. This mixing action is applied to the conveyed material over a prescribed distance, which is defined by the length of the tubular perforated portion 36, and which is proportional to a transfer rate of the material from the inlet 17 to the outlet 19. In other words, the longer the tubular perforated portion 36 of the housing, the more quickly the material can be conveyed in the downstream direction 33 for discharge at the outlet 19 because there is an increased likelihood that substantially all of the contaminants will have migrated to the screen 36 and subsequently out of the housing 12 due to the mixing action of the tabs 45 by the time the material has reached the downstream end of the screen 36.

The outer containment structure 65 acts to preliminarily temporarily collect the separated contaminants, and generally acts as a duct surrounding the tubular perforated portion 36 to guide airflow generated by the blower 72 across an exterior of the screen 36 to carry separated contaminants away therefrom and to a common collection space within the containment structure 65. The separated contaminants are subsequently released through the discharge port 74 to the external environment of the outer containment structure 65 and the conveyor 10 as a whole.

Therefore the particulate material received by the auger conveyor 10 for transfer from a first location to a second location is simultaneously cleaned, that is the conveyor 10 provides a cleaning action in parallel to the conveyance action, to remove contaminants by mechanical screening which is effected using only existing rotational movement of the conveying member 22 about its shaft axis A relative to a stationary tubular screen so that additional drive components are not required.

Thus is provided a relatively simple modification to an auger conveyor which enables the conveyor to perform a separation action in parallel with a conveyance action to separate components of a mixed input material, primarily by grade, while the material is moved or displaced by the conveyor, without additional equipment being operated in series with the modified auger conveyor to conduct such separation action.

As described herein the present invention relates to an auger conveyor for transferring, from a first location, a mixed material including granular material and unwanted particulate contaminants, to a second location, the granular material substantially free of the unwanted particulate contaminants, which comprises a housing in which there is rotatably supported a conveying member in the form of an auger or screw. A portion of the housing is perforated to provide a tubular screen, and the conveying member includes projecting agitation tabs along a length thereof which is coincident with the perforated portion of the housing, to propel the mixed material in the housing towards the screen so as to urge the unwanted particulate contaminants out of the housing leaving the granular material therein for conveyance to the outlet.

The scope of the claims should not be limited by the preferred embodiments set forth in the examples but should be given the broadest interpretation consistent with the specification as a whole.

The invention claimed is:

1. An auger conveyor for transferring, from a first location, a mixed material including granular material and unwanted particulate contaminants, to a second location, the granular material substantially free of the unwanted particulate contaminants, comprising:
   a housing extending longitudinally from a first end to a second end;
   an inlet defined by the housing for receiving the mixed material passed into the housing;
   an outlet defined by the housing at a longitudinally-spaced downstream location from the inlet for discharging out of the housing the granular material substantially free of the unwanted particulate contaminants;
   a conveying member in the housing configured to transfer particulate material therein from the inlet to the outlet, the conveying member comprising:
      a shaft oriented longitudinally of the housing and supported therein for rotation about an axis defined by the shaft;
      a flight mounted on the shaft and defining an outer edge following a helical path around the shaft from the inlet to the outlet of the housing, the flight defining a surface between the shaft and the outer edge which is arranged for displacing the particulate material from the inlet to the outlet during rotation of the shaft in a downstream conveyance rotational direction;
   wherein the housing comprises a tubular perforated portion commencing at an upstream location from the outlet and extending longitudinally from the upstream location towards the outlet, the tubular perforated portion of the housing locating a plurality of openings to provide a tubular screen surrounding the conveying member;
   wherein the openings are configured to permit passage of the unwanted particulate contaminants out of the housing and to retain the granular material therein for conveyance to the outlet;
   wherein the conveying member includes a plurality of projecting agitation tabs within a circumferential periphery of the conveying member delimited by the outer edge, the agitation tabs being arranged at axial locations registered with the screen and being configured to propel the mixed material towards the screen during rotation of the shaft in the downstream conveyance rotational direction so as to urge the unwanted particulate contaminants out of the housing leaving the granular material therein for conveyance to the outlet.

2. The auger conveyor of claim 1 wherein the tubular perforated portion extends longitudinally from said upstream location from the outlet to a downstream location which is also spaced from the outlet in a longitudinally upstream direction of the housing.

3. The auger conveyor of claim 1 further including a substantially enclosed outer containment structure registered with the tubular perforated portion of the housing, with respect to the longitudinal direction of the housing, arranged for containing the unwanted particulate contaminants expelled from the housing, wherein the outer containment structure comprises a tubular peripheral wall spaced outwardly from the tubular perforated portion of the housing and spanning a full length thereof in the longitudinal direction.

4. The auger conveyor of claim 3 further including a blower which is in fluidic communication with the outer containment structure and arranged to generate an airflow for emission into the outer containment structure to convey the separated unwanted particulate contaminants to a discharge port defined by the outer containment structure for subsequent release to collect externally of the outer containment structure.

5. The auger conveyor of claim 4 wherein the blower is arranged to generate the airflow in an upstream longitudinal direction which is opposite to the downstream longitudinal direction in which the material is transferred by the conveying member within the housing.

6. The auger conveyor of claim 4 wherein the housing is inclined such that the outlet is disposed at a higher elevation than the inlet, and the tubular screen is longitudinally spaced from the inlet so as to be disposed at a higher elevation than the inlet, such that the separated unwanted particulate contaminants in the outer containment structure are gravitationally urged towards the discharge port located at a lower end of the outer containment structure.

7. The auger conveyor of claim 4 wherein ducting which fluidically intercommunicates the blower and the outer containment structure is inclined relative to the housing so as to extend in a longitudinal and inward direction from the blower to the outer containment structure to guide the airflow in a transverse direction across the tubular perforated portion of the housing.

8. The auger conveyor of claim 1 wherein the agitation tabs project from the flight.

9. The auger conveyor of claim 8 wherein the agitation tabs are mounted on a downstream-facing surface of the flight.

10. The auger conveyor of claim 1 wherein each agitation tab defines a planar leading surface facing generally tangentially of the helical outer edge relative to the downstream conveyance rotational direction for engaging the mixed material during rotation of the conveying member in said downstream conveyance rotational direction.

11. The auger conveyor of claim 10 wherein, when the agitation tabs project from the flight, the planar leading surface of each agitation tab is oriented non-perpendicularly to a surface of the flight from which the leading surface projects.

12. The auger conveyor of claim 11 wherein the planar leading surface of each agitation tab forms an acute angle with said surface of the flight.

13. The auger conveyor of claim 10 wherein the leading surface of each agitation tab substantially lies in a radially extending plane of the shaft.

14. The auger conveyor of claim 1 wherein the tubular perforated portion of the housing is carried in intimate spaced relation to the outer edge of the flight such that there is a gap between the outer edge of the flight and an interior surface of the tubular perforated portion.

15. The auger conveyor of claim 14 wherein the tubular perforated portion is formed by a tubular screen assembly which is supported in said intimate spaced relation to the conveying member by an outwardly flared end of an upstream imperforate tubular portion of the housing which intimately encloses the conveying member.

16. The auger conveyor of claim 1 wherein the housing is supported on a frame by linkage which is configured to move the housing relative to the frame between an inclined working position, in which the housing is disposed in inclined orientation with the outlet at a higher elevation than the inlet, and a generally horizontal maintenance position in which the housing is oriented substantially horizontally with the outlet at a substantially common elevation as the inlet.

17. The auger conveyor of claim 16 wherein:
the housing is pivotally supported on the frame to define a generally-horizontal pivot axis oriented crosswise to the longitudinal direction of the housing, about which the housing pivots in movement between the working and maintenance positions; and the linkage comprises:
a lower arm having a lower end pivotally connected to the frame and extending therefrom in a generally longitudinally upstream direction, relative to the housing, to an upper end of the lower arm;
an upper arm having a lower end pivotally connected to the upper end of the lower arm and extending therefrom in a generally longitudinally downstream direction to an upper end of the upper arm which is pivotally coupled to the housing at a longitudinally downstream location from the pivot axis;
a linear actuator configured for extension and retraction between an upper end pivotally connected to the upper arm and a lower end pivotally connected to the lower arm for moving the housing between the working and maintenance positions;
the lower end of the linear actuator being supported below an imaginary line interconnecting the upper and lower ends of the lower arm so that the linear actuator is disposed in an inclined orientation in the maintenance position of the housing.

18. The auger conveyor of claim 17 wherein the frame includes a support post arranged to engage the upper arm at a downstream location from the upper end of the linear actuator when the housing is in the maintenance position.

19. The auger conveyor of claim 18 wherein, in the maintenance position of the housing, the linear actuator is disposed in a substantially fully retracted condition.

20. The auger conveyor of claim 18 wherein, in the maintenance position of the housing, the support post is arranged to pass through an opening in the lower arm.

21. The auger conveyor of claim 20 wherein the support post is in fixed position relative to the frame.

22. The auger conveyor of claim 17 further including an auxiliary support member mounted on the frame and arranged to selectively engage, in the working position of the housing, the upper arm of the linkage at a downstream location thereon from the upper end of the linear actuator to transmit weight of the housing to the frame in a manner substantially bypassing the linear actuator.

23. The auger conveyor of claim 22 wherein, when the upper arm is engaged by the auxiliary support member, the outlet of the housing is arranged at an intermediate height above the frame between a maximum height of the outlet in the working position and a minimum height of the outlet in the maintenance position.

24. The auger conveyor of claim 22 wherein the frame comprises an axle and a plurality of wheels supported thereon for rotation about an axis defined by the shaft, and, when the upper arm is engaged by the auxiliary support member, top and bottom ends of the support member are substantially vertically in-line with the axle.

25. The auger conveyor of claim 22 wherein the auxiliary support member is arranged to engage the upper end of the upper arm so as to substantially entirely bypass the linkage to support the weight of the housing disposed in the working position.

26. The auger conveyor of claim 22 wherein the auxiliary support member is movable relative to the frame and to the upper and lower arms of the linkage between a raised position in which the support member is standing upwardly from the frame to present a top end thereof for engaging the upper arm and a lowered position in which the auxiliary support member laying across the frame so as not to obstruct movement of the housing to the maintenance position.

27. The auger conveyor of claim 22 wherein the support member is configured to pass through an opening defined in the lower arm in movement to and from the lowered position, such that in the lowered position the auxiliary support member is disposed under the lower arm.

28. The auger conveyor of claim 22 wherein a bottom end of the auxiliary support member, which is opposite to the top end, is pivotally connected to the frame such that the auxiliary support member is pivotally movable between the raised and lowered positions.

29. The auger conveyor of claim 1 wherein the agitation tabs are disposed at inwardly spaced locations from the outer edge of the flight.

30. The auger conveyor of claim 1 wherein each agitation tab is angularly spaced from an adjacent one of the agitation tabs, relative to the shaft, by about 120 degrees.

* * * * *